United States Patent
Nakano et al.

(10) Patent No.: US 11,161,546 B2
(45) Date of Patent: Nov. 2, 2021

(54) WORK VEHICLE AND CONTROL METHOD FOR WORK VEHICLE

(71) Applicant: KOMATSU LTD., Tokyo (JP)

(72) Inventors: Kei Nakano, Tokyo (JP); Hiroki Yamamoto, Tokyo (JP); Kazuki Kure, Tokyo (JP); Souichi Tsumura, Tokyo (JP)

(73) Assignee: KOMATSU LTD., Tokyo (JP)

( * ) Notice: Subject to any disclaimer, the term of this patent is extended or adjusted under 35 U.S.C. 154(b) by 364 days.

(21) Appl. No.: 16/332,179

(22) PCT Filed: Jul. 31, 2017

(86) PCT No.: PCT/JP2017/027765
§ 371 (c)(1),
(2) Date: Mar. 11, 2019

(87) PCT Pub. No.: WO2019/026153
PCT Pub. Date: Feb. 7, 2019

(65) Prior Publication Data
US 2019/0263447 A1    Aug. 29, 2019

(51) Int. Cl.
*B62D 11/08*    (2006.01)
*B60T 11/21*    (2006.01)
(Continued)

(52) U.S. Cl.
CPC ............. *B62D 11/08* (2013.01); *B60T 11/21* (2013.01); *B62D 11/183* (2013.01);
(Continued)

(58) Field of Classification Search
CPC ..... B62D 11/08; B62D 11/001; B62D 11/003; E02F 9/2004; B60T 11/21
See application file for complete search history.

(56) References Cited

U.S. PATENT DOCUMENTS

| 5,244,066 A | 9/1993 | Mackoway et al. |
| 5,325,933 A * | 7/1994 | Matsushita ............ B62D 11/08 180/6.7 |

(Continued)

FOREIGN PATENT DOCUMENTS

| JP | 1-57963 U | 4/1989 |
| JP | 4-27674 A1 | 1/1992 |

(Continued)

OTHER PUBLICATIONS

The International Search Report for the corresponding international application No. PCT/JP2017/027765, dated Oct. 24, 2017.

(Continued)

*Primary Examiner* — Abiy Teka
(74) *Attorney, Agent, or Firm* — Global IP Counselors, LLP

(57) ABSTRACT

When left and right steering levers are both operated and the operation amount of the left lever is larger than that of the right lever, a controller calculates a correction left operation amount of the left lever according to the operation amount of the right lever, and controls a left steering clutch so as to cause a vehicle body to turn toward the left in accordance with the correction left operation amount. When left and right steering levers are both operated and the operation amount of the right lever is larger than that of the left lever, the controller calculates a correction right operation amount of the right lever according to the operation amount of the left lever, and controls a right steering clutch so as to cause the vehicle body to turn toward the right in accordance with the correction right operation amount.

10 Claims, 13 Drawing Sheets

(51) Int. Cl.
    *B62D 11/18*     (2006.01)
    *E02F 9/20*     (2006.01)
    *G05G 1/01*     (2008.04)
    *F16D 67/04*     (2006.01)

(52) U.S. Cl.
    CPC ............ *E02F 9/2004* (2013.01); *G05G 1/01* (2013.01); *F16D 67/04* (2013.01)

(56) References Cited

U.S. PATENT DOCUMENTS

| | | | | |
|---|---|---|---|---|
| 6,672,412 | B1* | 1/2004 | Charlson | B62D 11/003 |
| | | | | 180/6.48 |
| 8,322,135 | B2* | 12/2012 | Kure | E02F 9/2242 |
| | | | | 60/428 |
| 10,059,372 | B2* | 8/2018 | Sasada | B60W 10/06 |
| 10,619,329 | B2* | 4/2020 | Yoshikawa | E02F 9/2253 |
| 2014/0196961 | A1* | 7/2014 | Yoshikawa | B62D 11/005 |
| | | | | 180/6.62 |

FOREIGN PATENT DOCUMENTS

| | | |
|---|---|---|
| JP | 7-502315 A | 3/1995 |
| JP | 2000-185893 A | 7/2000 |
| JP | 2008-7111 A | 1/2008 |

OTHER PUBLICATIONS

Examination report No. 1 for the corresponding Australian application No. 2017426296, dated Jun. 26, 2020.

* cited by examiner

WORK VEHICLE AND CONTROL METHOD FOR WORK VEHICLE

CROSS-REFERENCE TO RELATED APPLICATIONS

This application is a U.S. National stage application of International Application No. PCT/JP2017/027765, filed on Jul. 31, 2017.

BACKGROUND

Field of the Invention

The present invention relates to a work vehicle and a control method for a work vehicle.

Background Information

A work vehicle such as a bulldozer includes a steering device. For example, the work vehicle in Japanese Unexamined Patent Application Publication No. H7-502315 includes a steering device for causing the vehicle to turn by producing a difference in the driving speeds of a left travel device and a right travel device. The steering device includes left and right steering clutches and left and right steering brakes. When the driving speed of the left travel device is reduced by using the left steering clutch and the left steering brake, the vehicle turns toward the left. When the driving speed of the right travel device is reduced by using the right steering clutch and the right steering brake, the vehicle turns toward the right.

The work vehicle in Japanese Unexamined Patent Application Publication No. H7-502315 is also provided with left and right levers. An operator operates the left lever thereby controlling the left operating clutch and the left steering brake and the vehicle turns toward the left. The operator operates the right lever thereby controlling the right operating clutch and the right steering brake and the vehicle turns toward the right.

Specifically, when the operator operates the left lever, the left steering clutch enters a slip state. As the operator further operates the left lever until reaching a point of about half of the full stroke, the left steering clutch is completely released. When the operator then further moves the left lever, braking by the left steering brake is started. When the operates the right lever, the right steering clutch and the right steering brake are operated in the same way as the left steering clutch and the right steering clutch.

SUMMARY

In the work vehicle of Japanese Unexamined Patent Application Publication No. H7-502315, when the operator operates the left lever and the right lever at the same time, the left steering clutch and the right steering clutch each perform the above actions independently. Therefore, when the left lever and the right lever are operated at the same time by the operator, a state may occur in which both the left steering clutch and the right steering clutch are completely released during the turning of the work vehicle. In this case, there is a problem that steering performance when turning the work vehicle is reduced. This reduction in steering performance signifies that the steering of the work vehicle becomes easily affected by the slope of the traveling surface and the like.

A purpose of the present invention is to improve steering performance when turning a work vehicle.

A work vehicle according to a first aspect includes a vehicle body, an engine, a left travel device, a right travel device, a steering device, a left steering lever, a right steering lever, and a controller. The engine is disposed in the vehicle body. The left travel device is attached to the vehicle body and is driven with driving power from the engine. The right travel device is attached to the vehicle body and is driven with driving power from the engine. The steering device includes a left steering clutch and a right steering clutch, and causes the vehicle body to turn. The left steering clutch is connected to the left travel device. The right steering clutch is connected to the right travel device. The left steering lever is disposed so as to be operable by an operator. The right steering lever is disposed so as to be operable by the operator. The controller receives a signal indicating an operation amount of the left steering lever and a signal indicating an operation amount of the right steering lever.

The controller controls the left steering clutch so as to cause the vehicle body to turn toward the left in accordance with the operation amount of the left steering lever when the left steering lever is operated without the right steering lever being operated. The controller controls the right steering clutch so as to cause the vehicle body to turn toward the right in accordance with the operation amount of the right steering lever when the right steering lever is operated without the left steering lever being operated.

When the left steering lever and the right steering lever are both operated and the operation amount of the left steering lever is larger than the operation amount of the right steering lever, the controller calculates a correction left operation amount in which the operation amount of the left steering lever is corrected according to the operation amount of the right steering lever, and controls the left steering clutch so as to cause the vehicle body to turn toward the left in accordance with the correction left operation amount. When the left steering lever and the right steering lever are both operated and the operation amount of the right steering lever is larger than the operation amount of the left steering lever, the controller calculates a correction right operation amount in which the operation amount of the right steering lever is corrected according to the operation amount of the left steering lever, and controls the right steering clutch so as to cause the vehicle body to turn toward the right in accordance with the correction right operation amount.

A method according to a second aspect is a method performed with a controller for controlling a work vehicle which includes a left steering clutch and a right steering clutch. The control method according to the present aspect includes the following processes.

The first process is receiving a signal indicating an operation amount of the left steering lever. The second process is receiving a signal indicating an operation amount of a right steering lever. The third process is controlling the left steering clutch so as to cause the vehicle body to turn toward the left in accordance with the operation amount of the left steering lever when the left steering lever is operated without the right steering lever being operated. The fourth process is controlling the right steering clutch so as to cause the vehicle body to turn toward the right in accordance with the operation amount of the right steering lever when the right steering lever is operated without the left steering lever being operated.

The fifth process is, when the left steering lever and the right steering lever are both operated and the operation amount of the left steering lever is larger than the operation amount of the right steering lever, calculating a correction left operation amount in which the operation amount of the left steering lever is corrected according to the operation amount of the right steering lever, and controlling the left steering clutch so as to cause the vehicle body to turn toward the left in accordance with the correction left operation amount. The sixth process is, when the left steering lever and the right steering lever are both operated and the operation amount of the right steering lever is larger than the operation amount of the left steering lever, calculating a correction right operation amount in which the operation amount of the right steering lever is corrected according to the operation amount of the left steering lever, and controlling the right steering clutch so as to cause the vehicle body to turn toward the right in accordance with the correction right operation amount.

According to the present invention, when the operation amount of the left steering lever is larger than the operation amount of the right steering lever, the left steering clutch is controlled so as to cause the work vehicle to turn toward the left in accordance with the correction left operation amount. When the operation amount of the right steering lever is larger than the operation amount of the left steering lever, the right steering clutch is controlled so as to cause the work vehicle to turn toward the right in accordance with the correction right operation amount. As a result, even when the left steering lever and the right steering lever are operated at the same time, the operation having the larger operation amount is considered valid. Therefore, when the left steering lever and the right steering lever are operated at the same time, the state in which both the left steering clutch and the right steering clutch are completely released can be prevented in comparison to the case in which the left steering clutch and the right steering clutch are each controlled independently. As a result, steering performance of the work vehicle during turning can be improved.

DETAILED DESCRIPTION OF EMBODIMENT(S)

Figure 1:
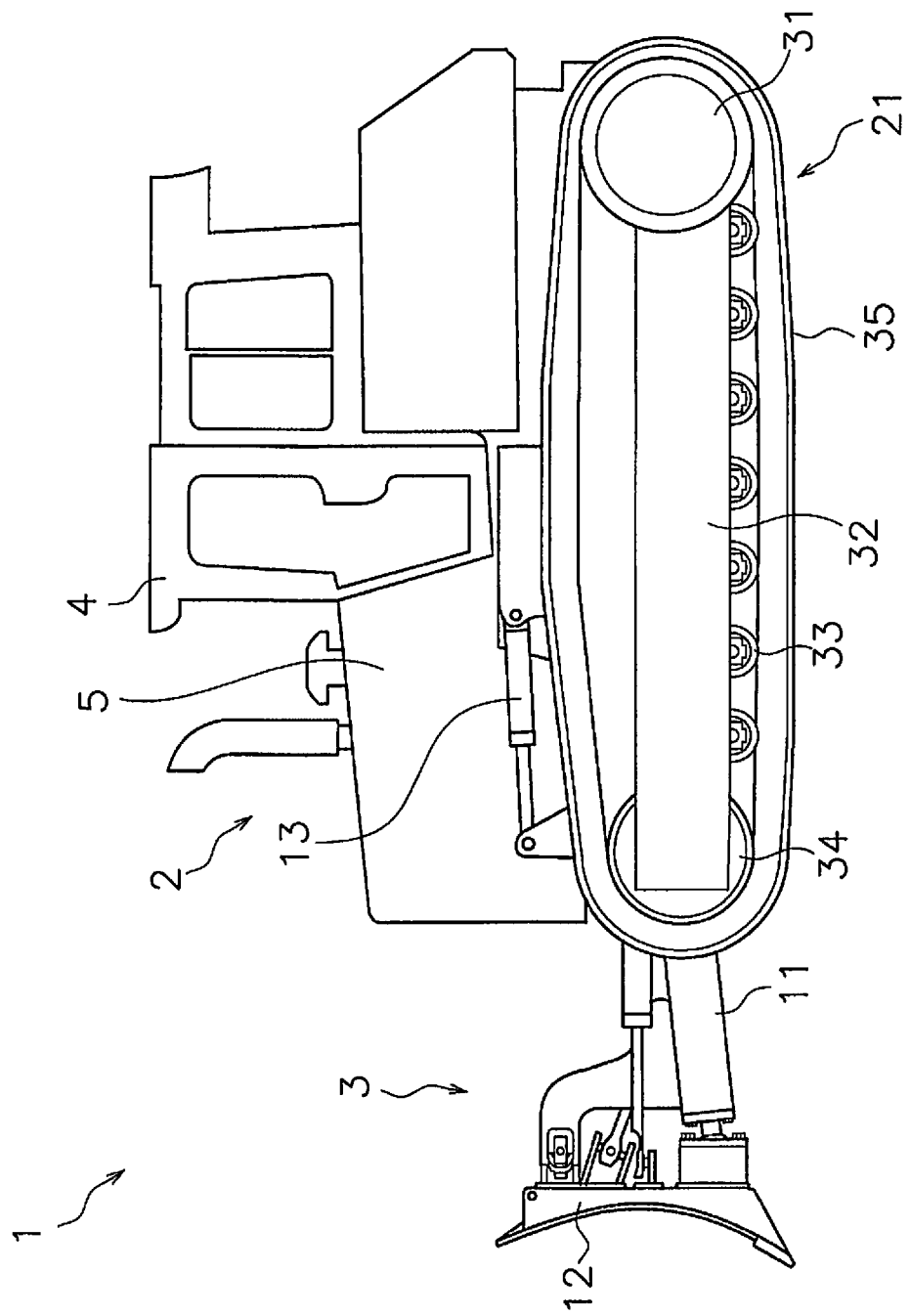
FIG. 1 is a side view of a work vehicle according to an embodiment.

A work vehicle according to an embodiment is discussed hereinbelow in detail with reference to the drawings. FIG. 1 is a side view of a work vehicle 1 according to an embodiment. The work vehicle 1 according to the present embodiment is a bulldozer. The work vehicle 1 includes a vehicle body 2 and a work implement 3.

The vehicle body 2 includes an operating cabin 4 and an engine room 5. The engine room 5 is disposed in front of the operating cabin 4. The work implement 3 is attached to the vehicle body 2. The work implement 3 includes a lift frame 11, a blade 12, and a lift cylinder 13.

The lift frame 11 is attached to the vehicle body 2 in a manner that allows movement up and down. The lift frame 11 supports the blade 12. The blade 12 is disposed in front of the vehicle body 2. The blade 12 moves up and down accompanying the up and down movements of the lift frame 11. The lift cylinder 13 is coupled to the vehicle body 2 and the lift frame 11. Due to the extension and contraction of the lift cylinder 13, the lift frame 11 moves up and down.

Figure 2:
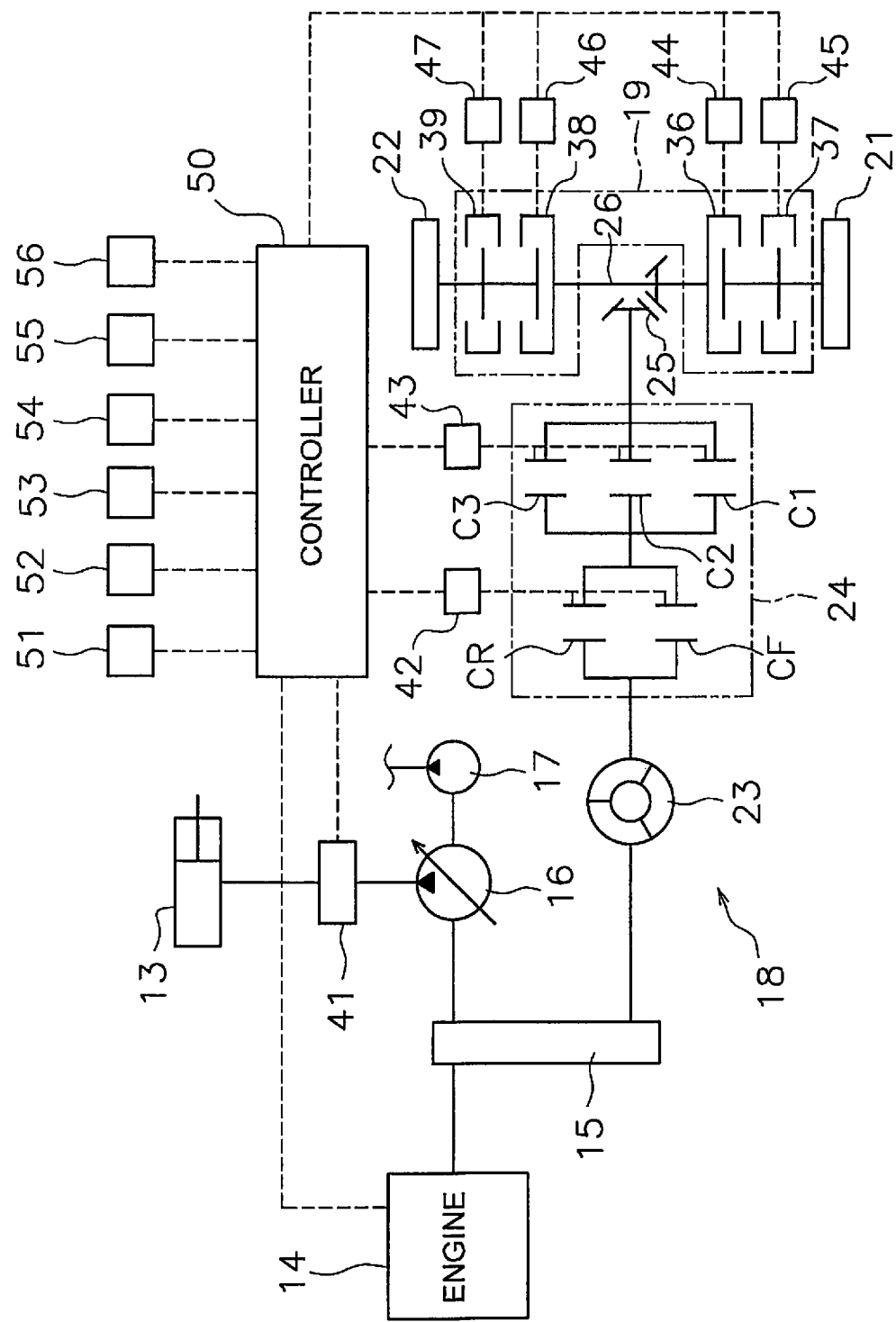
FIG. 2 is a block diagram illustrating a configuration of the work vehicle.

FIG. 2 is a block diagram of a configuration of the work vehicle 1. As illustrated in FIG. 2, the work vehicle 1 includes an engine 14, a power take-off (PTO) 15, hydraulic pumps 16 and 17, a power train 18, a steering device 19, and travel devices 21 and 22. A fuel injection device and an ignition device, which are not illustrated, are provided in the engine 14 and the output of the engine 14 is controlled by controlling said devices. The PTO 15 distributes the driving power of the engine 14 to the hydraulic pumps 16 and 17 and the power train 18.

The hydraulic pumps 16 and 17 are driven by the engine 14 to discharge hydraulic fluid. The hydraulic fluid discharged from the hydraulic pump 16 is supplied to a hydraulic actuator such as the lift cylinder 13. The hydraulic fluid discharged from the hydraulic pump 17 is supplied to clutches in the power train 18 and to the steering device 19. While only the two hydraulic pumps 16 and 17 are illustrated in FIG. 2, other hydraulic pumps may be provided.

The power train 18 transmits driving power from the engine 14 to the travel devices 21 and 22. The power train 18 includes a torque converter 23 and a transmission 24. The transmission 24 includes a plurality of gears which are not illustrated.

The transmission 24 includes a forward clutch CF and a reverse clutch CR. By changing the engagement and release of the forward clutch CF and the reverse clutch CR, the work vehicle 1 can be switched between forward travel and reverse travel. The transmission 24 includes a plurality of speed change clutches C1 to C3. By switching between the engagement and release of the plurality of speed change clutches C1 to C3, the transmission gear ratio of the transmission 24 can be switched. While three speed change clutches C1 to C3 are illustrated in FIG. 2, the number of speed change clutches is not limited to three and may be less than three or more than three.

The power train 18 may not be provided with the torque converter 23. Alternatively, the power train 18 may be provided with another transmission such as a hydro static transmission (HST) or a hydro mechanical transmission (HMT).

The output shaft of the power train 18 is connected via a bevel gear 25 to an axle shaft 26. The axle shaft 26 is connected via the steering device 19 to the travel devices 21 and 22. The travel devices 21 and 22 include the left travel device 21 and the right travel device 22. The left travel device 21 and the right travel device 22 are attached to the vehicle body 2. The left travel device 21 and the right travel device 22 are driven by driving power from the engine 14.

As illustrated in FIG. 1, the left travel device 21 includes a sprocket 31, a track frame 32, a plurality of rollers 33, an idler 34, and a crawler belt 35. It should be noted that only one of the plurality of rollers is given the reference numeral "33" and the reference numerals are omitted for the other rollers. The sprocket 31 is connected via the steering device 19 to the axle shaft 26. The track frame 32 rotatably supports the plurality of rollers 33 and the idler 34. The crawler belt 35 is wound around the sprocket 31, the plurality of rollers 33, and the idler 34.

The driving power from the engine 14 is transmitted via the power train 18, the axle shaft 26, and the steering device 19 to the sprocket 31, whereby the sprocket 31 rotates. As a result, the crawler belt 35 rotates and the work vehicle 1 travels. While only the left travel device 21 is illustrated in FIG. 1, the right travel device 22 includes the same configuration as the left travel device 21.

The steering device 19 produces a difference in the driving speeds of the left travel device 21 and the right travel device 22 to cause the vehicle body 2 to turn. Specifically, the steering device 19 reduces the driving speed of the left travel device 21 more than the driving speed of the right travel device 22, whereby the vehicle body 2 is made to turn toward the left. The steering device 19 reduces the driving speed of the right travel device 22 more than the driving speed of the left travel device 21, whereby the vehicle body 2 is made to turn toward the right.

The steering device 19 includes a left steering clutch 36, a left brake device 37, a right steering clutch 38, and a right brake device 39. The left steering clutch 36 is connected to the left travel device 21. The left steering clutch 36 is switched between an engaged state, a slip state, and a released state. The left steering clutch 36 is connected to the axle shaft 26 and the left travel device 21 in the engaged state. The left steering clutch 36 is not connected to the axle shaft 26 and the left travel device 21 in the released state. The left steering clutch 36 is, for example, a friction clutch that includes a plurality of clutch disks. However, the left steering clutch 36 may be another type for clutch.

The left steering clutch 36 is, for example, a hydraulic clutch. The hydraulic pressure applied to the left steering clutch 36 is controlled, whereby the left steering clutch 36 is switched between the engaged state, the slip state, and the released state. By applying hydraulic pressure of a predetermined pressure or greater to the left steering clutch 36, the left steering clutch 36 enters the released state. When the hydraulic pressure applied to the left steering clutch 36 is less than the predetermined pressure, the left steering clutch 36 enters the engaged state due to a biasing force of a biasing member which is not illustrated. In the slip state, the engagement force of the left steering clutch 36 is controlled with the hydraulic pressure applied to the left steering clutch 36. However, the left steering clutch 36 is not limited to a hydraulic clutch and may be another type for clutch.

The left brake device 37 is connected to the left travel device 21. The left brake device 37 brakes the left travel device 21. The left brake device 37 brakes the left travel device 21, for example, by using the friction of a plurality of brake disks. However, the left brake device 37 may be another type of brake.

The left brake device 37 is, for example, a hydraulic brake. By controlling the hydraulic pressure applied to the left brake device 37, the braking force of the left brake device 37 is controlled. Hydraulic pressure of a predetermined pressure or greater is applied to the left brake device 37 whereby the left brake device 37 enters a non-braking state. When the hydraulic pressure applied to the left brake device 37 is less than the predetermined pressure, the left brake device 37 enters the braking state due to a biasing force of a biasing member which is not illustrated. However, the left brake device 37 is not limited to a hydraulic brake and may be another type of brake.

The right steering clutch 38 is connected to the right travel device 22. The right steering clutch 38 is switched between the engaged state, the slip state, and the released state. The right steering clutch 38 is connected to the axle shaft 26 and the right travel device 22 in the engaged state. The right steering clutch 38 is not connected to the axle shaft 26 and the right travel device 22 in the released state. The right steering clutch 38 is, for example, a friction clutch that includes a plurality of clutch disks. However, the right steering clutch 38 may be another type of clutch. The configuration of the right steering clutch 38 is the same as that of the left steering clutch 36 and therefore a detailed explanation thereof is omitted.

The right brake device 39 is connected to the right travel device 22. The right brake device 39 brakes the right travel device 22. The configuration of the right brake device 39 is the same as that of the left brake device 37 and therefore a detailed explanation thereof is omitted.

A control system of the work vehicle 1 will be discussed next. As illustrated in FIG. 2, the work vehicle 1 includes control valves 41 to 47, a controller 50, and operating devices 51 to 56. The control valves 41 to 47 are proportional control valves and are controlled by command signals from the controller 50. The control valves 41 to 47 may be pressure proportional control valves. Alternatively, the control valves 41 to 47 may be electromagnetic proportional control valves. The control valves 41 to 47 include a work implement control valve 41, a FR clutch control valve 42, and a speed change clutch control valve 43.

The work implement control valve 41 controls the flow rate of the hydraulic fluid supplied to the hydraulic actuators such as the lift cylinder 13. The FR clutch control valve 42 controls the flow rate of the hydraulic fluid supplied to the forward clutch CF and the reverse clutch CR. The speed change clutch control valve 43 controls the flow rate of the hydraulic fluid supplied to the plurality of speed change clutches C1 to C3.

The control valves 41 to 47 include a left clutch control valve 44, a left brake control valve 45, a right clutch control valve 46, and a right brake control valve 47. The left clutch control valve 44 controls the flow rate of the hydraulic fluid supplied to the left steering clutch 36. The left brake control valve 45 controls the flow rate of the hydraulic fluid supplied to the left brake device 37. The right clutch control valve 46 controls the flow rate of the hydraulic fluid supplied to the right steering clutch 38. The right brake control valve 47 controls the flow rate of the hydraulic fluid supplied to the right brake device 39.

The controller 50 is programmed so as to control the work vehicle 1 on the basis of acquired data. The controller 50 includes a processor such as a CPU, and a storage device such as a semiconductor memory, an optical recording medium, or a magnetic recording medium. The storage device is an example of a non-transitory computer-readable recording medium. The storage device records computer commands that are executable by the processor and that are for controlling the work vehicle 1.

The controller 50 is connected to the control valves 41 to 47 so as to allow wired or wireless communication. The controller 50 is connected to the operating devices 51 to 56 so as to allow wired or wireless communication. The controller 50 is not limited to one component and may be divided into a plurality of controllers.

The operating devices 51 to 56 are devices for operating the work implement 3 and the travel devices 21 and 22. The operating devices 51 to 56 are disposed in the operating cabin 4. The operating devices 51 to 56 accept operations from an operator for driving the work implement 3 and the travel devices 21 and 22, and output operation signals in accordance with the operations.

The operating devices 51 to 56 include the operating device 51 for the work implement 3, the operating device 52 for forward and reverse travel, and the operating device 53 for changing the speed in the transmission 24. The operating device 51 for the work implement 3 is an operating lever for the blade 12, for example. The controller 50 moves the blade 12 by controlling the work implement control valve 41 in accordance with the operation of the operating device 51 for the work implement 3.

The operating device 52 for forward and reverse travel is, for example, a rocker switch. The controller 50 switches the transmission 24 between a forward travel state, a reverse travel state, and a neutral state by controlling the FR clutch control valve 42 in accordance with the operation of the operating device 52 for forward and reverse travel. The operating device 53 for changing the speed of the transmission 24 is, for example, a press button switch. The controller 50 changes the speed of the transmission 24 by controlling the speed change clutch control valve 43 in accordance with the operation of the operating device 53 for changing the speed of the transmission 24.

The operating devices 51 to 56 include the operating device 54 for the engine rotation speed. The operating device 54 for the engine rotation speed is, for example, a dial switch. The operator sets a target rotation speed for the engine 14 by using the operating device 54 for the engine rotation speed. The controller 50 sets the target rotation speed for the engine 14 in accordance with the operating position of the operating device 54 for the engine rotation speed. The controller 50 controls the engine 14 so that the actual rotation speed of the engine 14 approximates the target rotation speed.

The operating devices 51 to 56 include the left steering lever 55 and the right steering lever 56. The controller 50 causes the work vehicle 1 to turn toward the left and right by controlling the steering device 19 in accordance with the operations of the left steering lever 55 and the right steering lever 56.

For example, the controller 50 controls the steering device 19 so as to cause the vehicle body 2 to turn toward the left when the left steering lever 55 is operated without the right steering lever 56 being operated. The controller 50 controls the steering device 19 so as to cause the vehicle body 2 to turn toward the right when the right steering lever 56 is operated without the left steering lever 55 being operated. The operations of the left steering lever 55 and the right steering lever 56 are discussed in detail below.

The modes of the operating devices 51 to 56 are not limited to the above and the operating devices 51 to 56 may include any mode such as levers, switches, touch panels, or the like.

Figure 3:
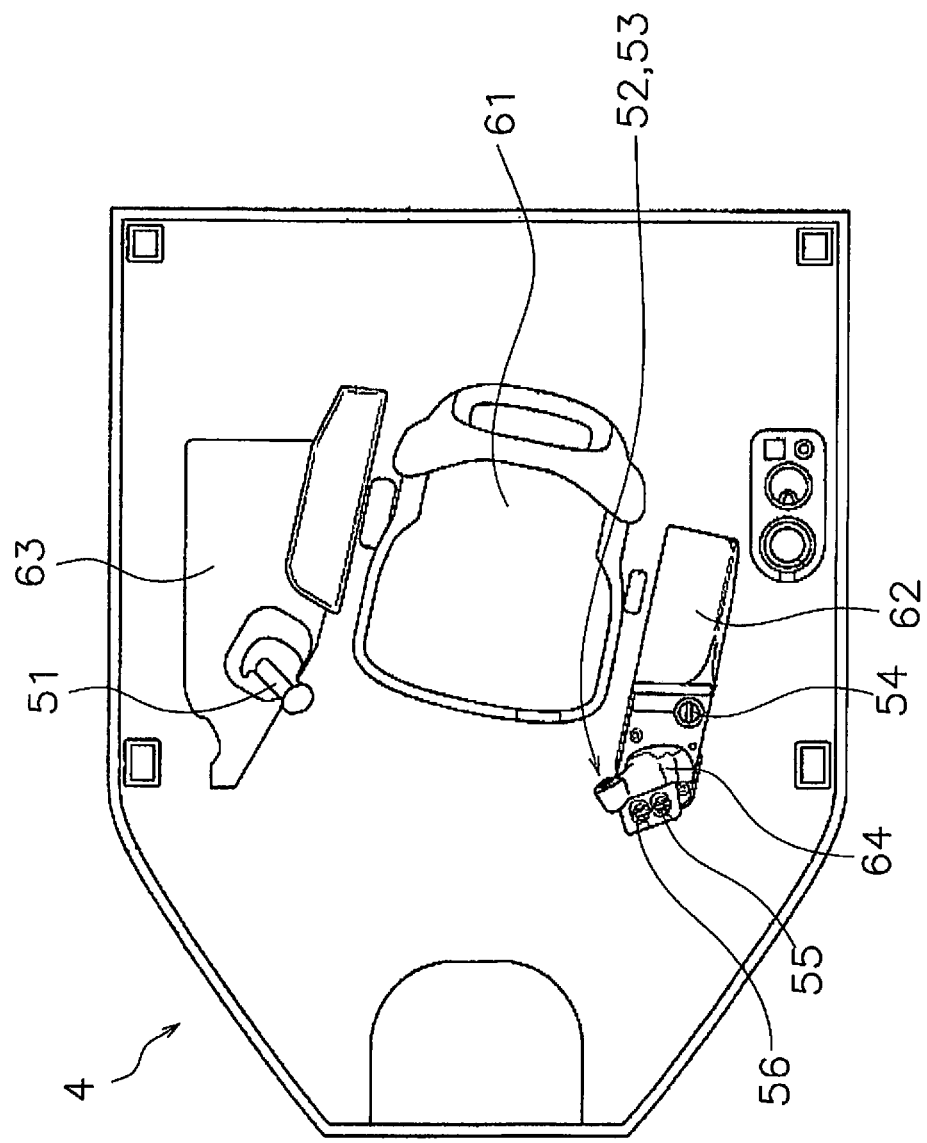
FIG. 3 is a plan view of the inside of an operating cabin.

FIG. 3 is a plan view of the inside of the operating cabin 4. As illustrated in FIG. 3, an operator's seat 61, a first console 62, and a second console 63 are disposed inside the operating cabin 4. The first console 62 is disposed on the left side of the operator's seat 61. The second console 63 is disposed on the right side of the operator's seat 61. However, the first console 62 and the second console 63 may be disposed on the opposite sides.

The abovementioned operating device 52 for forward and reverse travel, the operating device 53 for changing the speed of the transmission 24, the left steering lever 55, and the right steering lever 56 are disposed in the first console 62. The operating device 51 for the work implement 3 is disposed in the second console 63.

Figure 4:
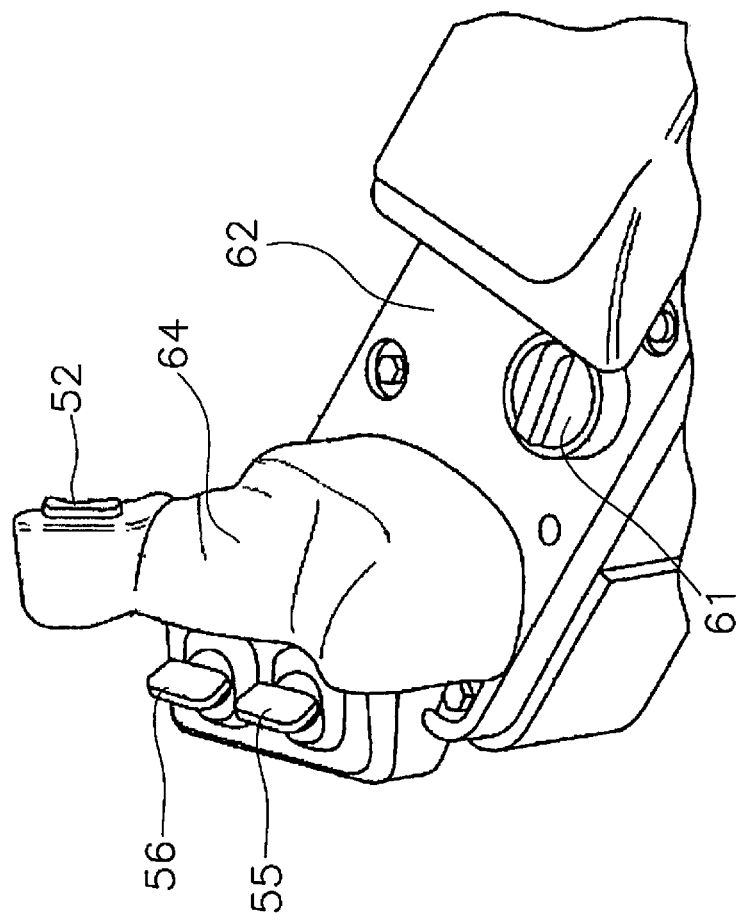
FIG. 4 is an enlarged perspective view of a front part of a first console.

FIG. 4 is an enlarged perspective view of the front part of the first console 62. As illustrated in FIG. 4, a palm rest 64 is disposed on the first console 62 for the operator to place the palm of his/her hand. One portion of the palm rest 64 extends toward the operator's seat 61, and the operating device 52 for forward and reverse travel and the operating device 53 for changing the speed of the transmission 24 are disposed in another portion of the palm rest 64. For example, the operator is able to operate the operating device 52 for forward and reverse travel and the operating device 53 for changing the speed of the transmission 24 with his/her thumb.

The left steering lever 55 and the right steering lever 56 are disposed in front of the palm rest 64. The left steering lever 55 and the right steering lever 56 are disposed side by side. The left steering lever 55 and the right steering lever 56 are disposed so as to be operable from the neutral position toward the rear. The left steering lever 55 and the right steering lever 56 can be operated by the operator with his/her fingers. For example, the operator can respectively operate the left steering lever 55 and the right steering lever 56 with two fingers while the palm of his/her hand is placed on the palm rest 64.

Figure 5:
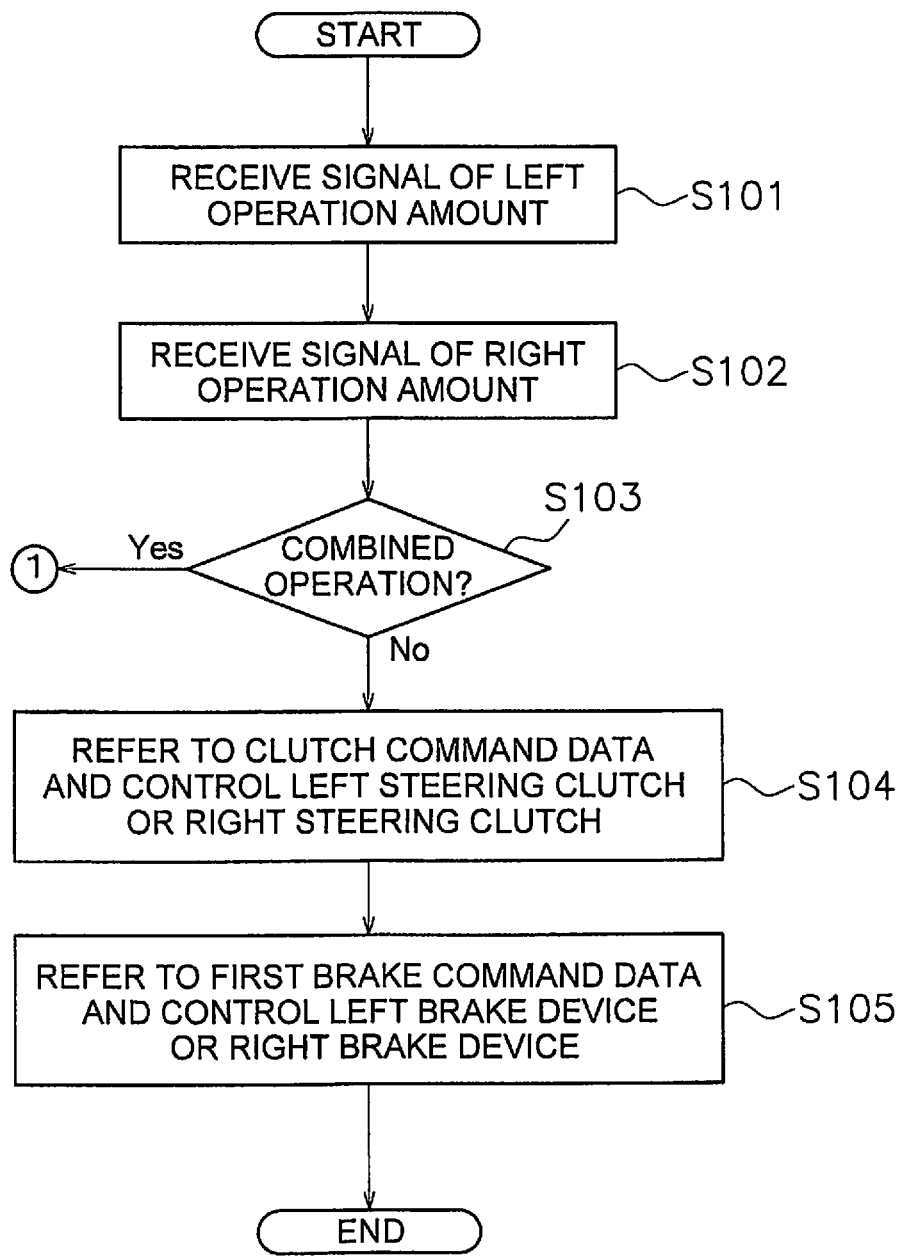
FIG. 5 is a flow chart which illustrates processing performed in accordance with operations of the left steering lever and the right steering lever.

The control of the steering device 19 in accordance with the operation of the left steering lever 55 and the right steering lever 56 will be discussed next. FIG. 5 is a flow chart which illustrates processing executed by the controller 50 in accordance with operations of the left steering lever 55 and the right steering lever 56.

As illustrated in FIG. 5, in step S101, the controller 50 receives a signal from the left steering lever 55 indicating the operation amount (referred to below as "left operation amount") of the left steering lever 55. In step S102, the controller 50 receives a signal from the right steering lever 56 indicating the operation amount (referred to below as "right operation amount") of the right steering lever 56.

In step S103, the controller 50 determines whether a combined operation of the left steering lever 55 and the right steering lever 56 is being performed. The controller 50 determines whether the left steering lever 55 and the right steering lever 56 are both being operated on the basis of the signals from the left steering lever 55 and the right steering lever 56. The controller 50 decides that a combined operation is being performed when the left steering lever 55 and the right steering lever 56 are both being operated.

When a combined operation of the left steering lever 55 and the right steering lever 56 is not being performed, the processing advances to step S104. That is, the processing advances to step S104 when a separate operation of the left steering lever 55 or a separate operation of the right steering lever 56 is being performed. The separate operation of the left steering lever 55 signifies a state in which the left steering lever 55 is being operated without the right steering lever 56 being operated. The separate operation of the right steering lever 56 signifies a state in which the right steering lever 56 is being operated without the left steering lever 55 being operated.

In FIG. 5, steps S104 and S105 illustrate processing for turning control of the work vehicle 1 during the separate operations.

In step S104, the controller 50 controls the left steering clutch 36 or the right steering clutch 38 according to clutch command data. In step S105, the controller 50 controls the left brake device 37 or the right brake device 39 according to first brake command data. The clutch command data and the first brake command data are stored in the storage device of the controller 50 in a table format and the like. However, the formats of the clutch command data and the first brake command data are not limited to tables and may be in another format such as equations or the like.

Figure 6:
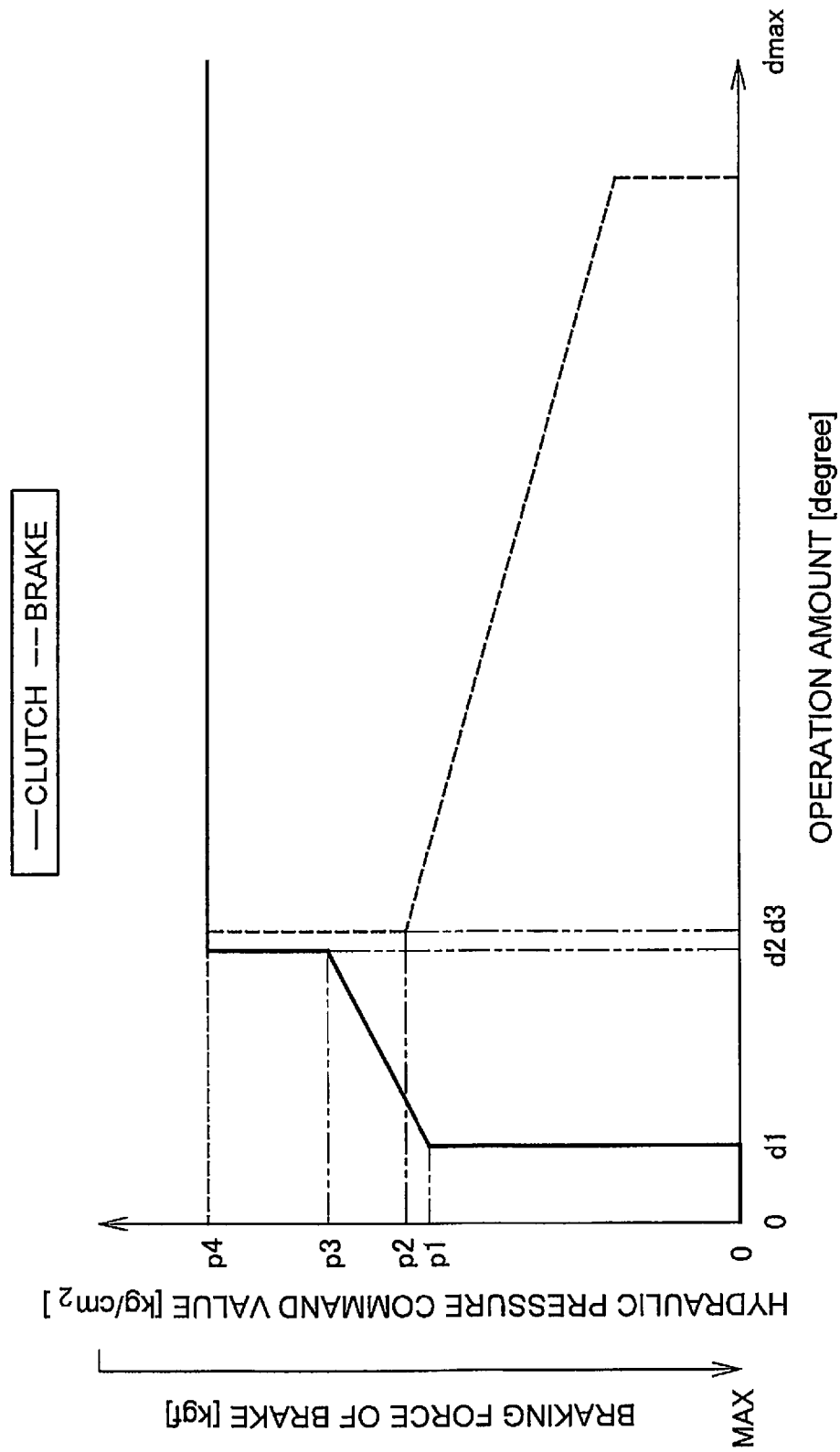
FIG. 6 illustrates an example of clutch command data and first brake command data.

FIG. 6 illustrates examples of the clutch command data and the first brake command data. The clutch command data defines the relationship between the left operation amount or the right operation amount and a hydraulic pressure command value for the left steering clutch 36. The first brake command data defines the relationship between the left operation amount or the right operation amount and the hydraulic pressure command value for the left brake device 37.

The controller 50 refers to the clutch command data and decides the hydraulic pressure command value for the left steering clutch 36 from the left operation amount at the time of a separate operation of the left steering lever 55. The controller 50 outputs a command signal in accordance with the decided hydraulic pressure command value to the left clutch control valve 44. As a result, the left steering clutch 36 is controlled in accordance with the left operation amount.

The controller 50 refers to the first brake command data and decides a hydraulic pressure command value for the left brake device 37 from the left operation amount at the time of a separate operation of the left steering lever 55. The controller 50 outputs a command signal in accordance with the decided hydraulic pressure command value to the control valve 45 of the left brake device 37. As a result, the left brake device 37 is controlled in accordance with the left operation amount.

Additionally, the controller 50 refers to the clutch command data and decides a hydraulic pressure command value for the right steering clutch 38 from the right operation amount at the time of a separate operation of the right steering lever 56. The controller 50 outputs a command signal in accordance with the decided hydraulic pressure command value to the right clutch control valve 46. As a result, the right steering clutch 38 is controlled in accordance with the right operation amount.

The controller 50 refers to the first brake command data and decides a hydraulic pressure command value for the right brake device 39 from the right operation amount at the time of a separate operation of the right steering lever 56. The controller 50 outputs a command signal in accordance with the decided hydraulic pressure command value to the right brake control valve 47. As a result, the right brake device 39 is controlled in accordance with the right operation amount.

Processing at the time of a separate operation of the left steering lever 55 will be discussed next. In FIG. 6, the left operation amount is depicted by the angle of the left steering lever 55. The left operation amount is 0 degrees at the neutral position in which the left steering lever 55 is not being operated. In FIG. 6, dmax indicates the maximum value of the left operation amount.

As illustrated in FIG. 6, when the left operation amount is less than a threshold d1, the hydraulic pressure command value for the left steering clutch 36 is "0." Moreover, the hydraulic pressure command value for the left brake device 37 is "p4." When the hydraulic pressure to the left steering clutch 36 is "0," the left steering clutch 36 is maintained in the engaged state. When the hydraulic pressure to the left brake device 37 is "p4," the left brake device 37 is maintained in the non-braking state. Because no difference is produced in the driving speeds of the left travel device 21 and the right travel device 22 in the above states, the work vehicle 1 moves forward. When the hydraulic pressure to the left brake device 37 is "0," the left brake device 37 exerts the maximum braking force.

When the left operation amount is at the threshold "d1," the hydraulic pressure command value for the left steering clutch 36 is "p1." When the left operation amount is the threshold "d1" or greater and less than the threshold "d2," the hydraulic pressure command value for the left steering clutch 36 increases from "p1" to "p3" in accordance with the increase of the left operation amount. It should be noted that "d1" is greater than zero. However, the threshold "d1" may be zero. The threshold "d2" is greater than "d1." The command value "p3" is greater than "p1" and less than "p4."

When the hydraulic pressure to the left steering clutch 36 is between the value "p1" and the value "p3," the left steering clutch 36 is in the slip state. The connection force of the left steering clutch 36 is reduced in accordance with the increase in the hydraulic pressure to the left steering clutch 36. Therefore, when the left operation amount is the threshold "d 1" or greater and less than the threshold "d2," the connection force of the left steering clutch 36 is reduced in accordance with the increase in the left operation amount, whereby the driving speed of the left travel device 21 is reduced. Consequently, the difference between the driving speeds of the left travel device 21 and the right travel device 22 becomes larger, whereby the work vehicle 1 turns toward the left.

When the left operation amount is equal to or greater than the threshold "d2," the hydraulic pressure command value for the left steering clutch 36 is "p4." When the hydraulic pressure for the left steering clutch 36 is "p4," the left steering clutch 36 is maintained in the released state.

When the left operation amount is less than the threshold "d3," the hydraulic pressure command value for the left brake device 37 is "p4." Therefore, when the left operation amount is less than the threshold "d3," the left brake device 37 is maintained in a non-braking state. It should be noted that "d3" is greater than "d2."

When the left operation amount is equal to or greater than the threshold "d3," the hydraulic pressure command value for the left brake device 37 is reduced from "p2" in accordance with the increase in the left operation amount. The left brake device 37 increases the braking force in correspondence to the reduction of the hydraulic pressure to the left brake device 37. Therefore, when the left operation amount is equal to or greater than the threshold "d3," the braking force of the left brake device 37 increases in accordance with the increase in the left operation amount, whereby the driving speed of the left travel device 21 is reduced. Consequently, the difference between the driving speeds of the left travel device 21 and the right travel device 22 becomes larger, whereby the work vehicle 1 turns toward the left.

As discussed above, when the left travel lever is operated to move from "0" to "dmax" during a separate operation of the left travel lever, firstly the left steering clutch 36 switches from the engaged state to the slip state and the connection force of the left steering clutch 36 is reduced, whereby the driving speed of the left travel device 21 is reduced. After the left steering clutch 36 has entered the released state, the braking force of the left brake device 37 is then increased, whereby the driving speed of the left travel device 21 is further reduced. Consequently, the turning angle to the left of the work vehicle 1 is controlled in accordance with the operation of the left travel lever.

The right operation amount is "0" at the time of the separate operation of the left travel lever. Therefore, the right steering clutch 38 is in the engaged state and the right brake device 39 is in the non-braking state.

At the time of the separate operation of the right steering lever 56, the right steering clutch 38 and the right brake device 39 are controlled in the same way as the left steering clutch 36 and the left brake device 37 respectively. Therefore, a detailed explanation of the processing at the time of the separate operation of the right steering lever 56 is omitted.

Figure 7:
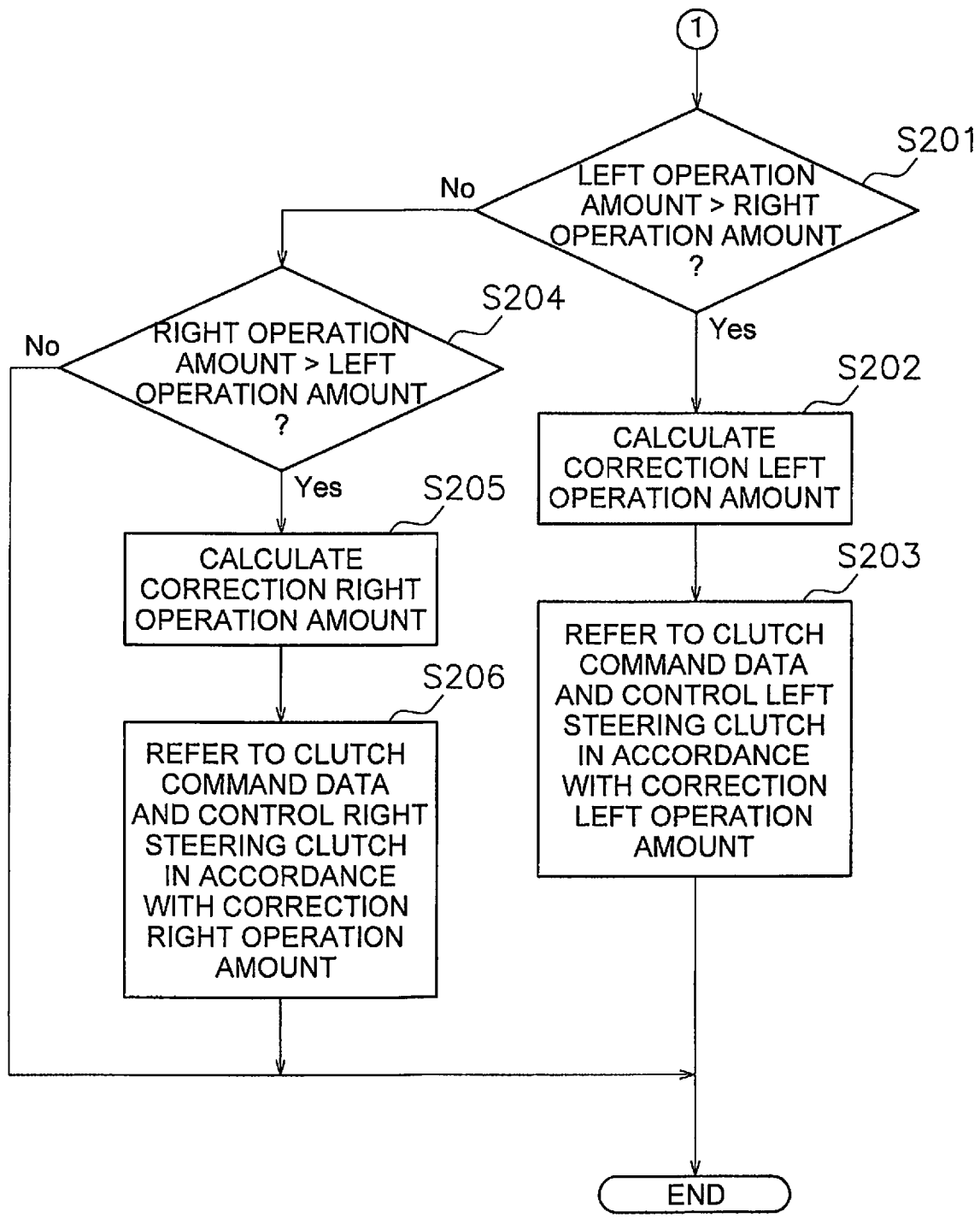
FIG. 7 is a flow chart which illustrates processing of turning control of the work vehicle during a combined operation.
Figure 8:
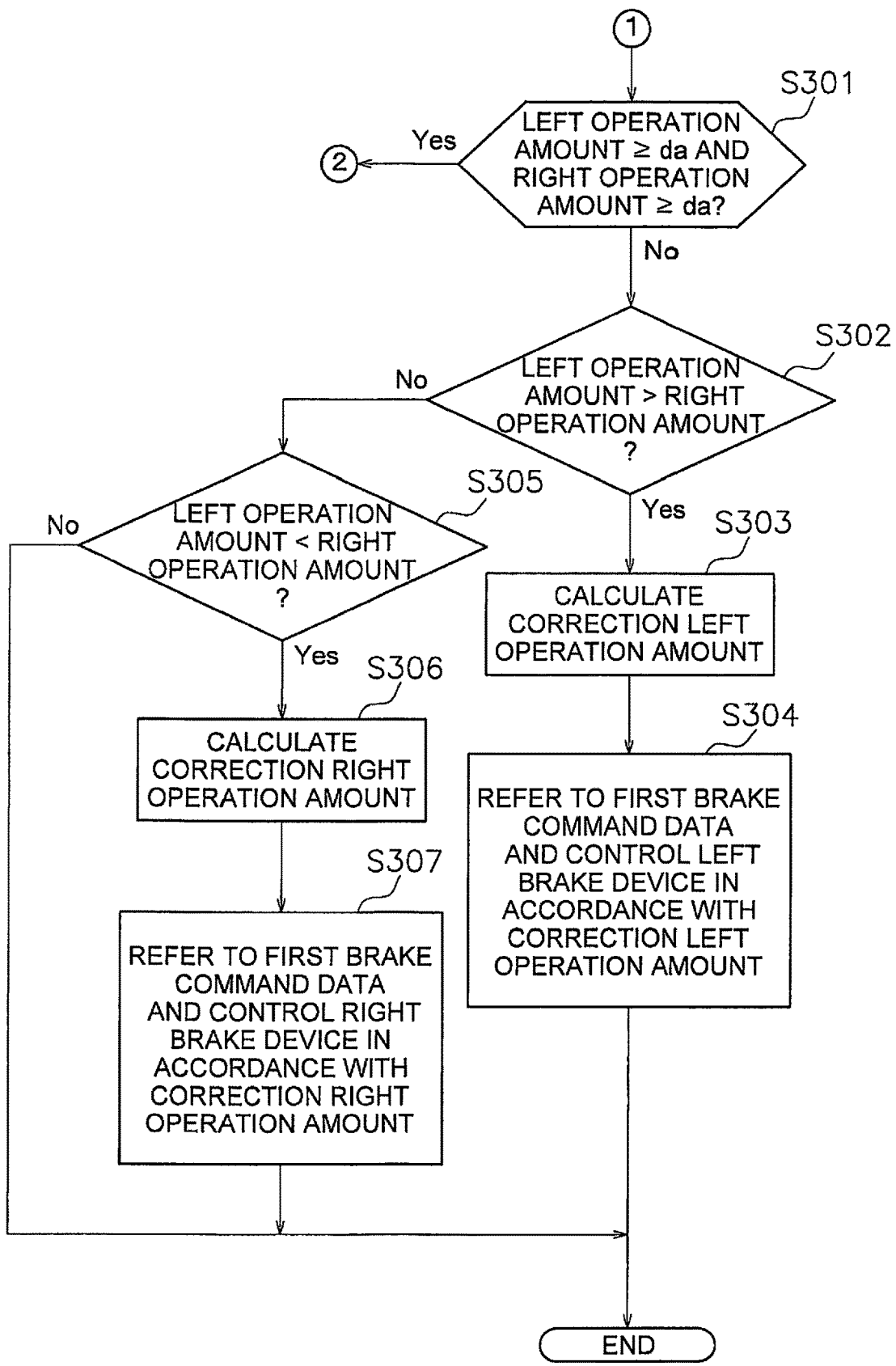
FIG. 8 is a flow chart which illustrates processing of turning control of the work vehicle during a combined operation.
Figure 9:
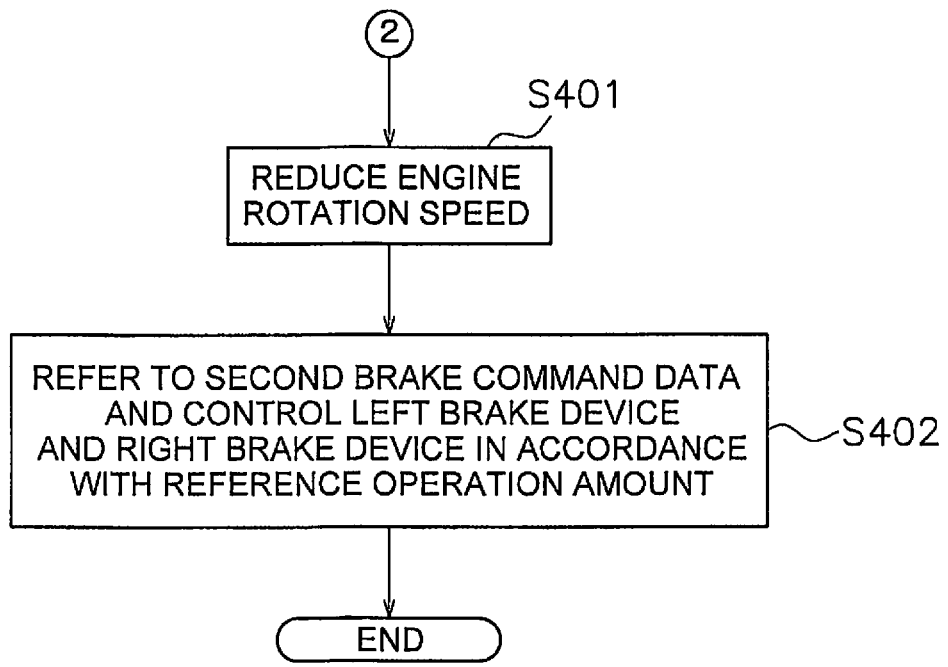
FIG. 9 is a flow chart which illustrates processing of deceleration control of the work vehicle during a combined operation.

In step S103 above, when the controller determines that a combined operation is being performed, the controller 50 executes the processing indicated in FIG. 7 to FIG. 9. FIGS. 7 and 8 are flow charts which illustrate the processing of the turning control of the work vehicle 1 during the combined operation. Specifically, FIG. 7 illustrates processing for controlling the left steering clutch 36 and the right steering clutch 38 during the turning control.

As illustrated in FIG. 7, in step S201, the controller 50 determines whether the left operation amount is greater than the right operation amount. When the left operation amount is greater than the right operation amount, the processing advances to step S202.

In step S202, the controller 50 calculates a correction left operation amount. The controller 50 derives a value obtained by subtracting the right operation amount from the left operation amount as the correction left operation amount.

In step S203, the controller 50 then refers to the clutch command data and controls the left steering clutch 36 in accordance with the correction left operation amount. The controller 50 refers to the clutch command data depicted in FIG. 6 and decides the hydraulic pressure command value for the left steering clutch 36 in accordance with the correction left operation amount. At this time, the correction left operation amount is used in place of the abovementioned left operation amount. The controller 50 outputs a command signal in accordance with the decided hydraulic pressure command value to the left clutch control valve 44. As a result, the left steering clutch 36 is controlled in accordance with the correction left operation amount, and the work vehicle 1 turns toward the left.

In step S203, the operation of the right operating lever is deactivated. Therefore, the right steering clutch 38 is in the engaged state and the right brake device 39 is in the non-braking state.

In step S201, when the left operation amount is not greater than the right operation amount, the processing advances to step S204. In step S204, the controller 50 determines whether the right operation amount is greater than the left operation amount. When the right operation amount is greater than the left operation amount, the processing advances to step S205.

In step S205, the controller 50 calculates a correction right operation amount. The controller 50 derives a value obtained by subtracting the left operation amount from the right operation amount as the correction right operation amount.

In step S206, the controller 50 then refers to the clutch command data and controls the right steering clutch 38 in accordance with the correction right operation amount. The controller 50 refers to the clutch command data depicted in FIG. 6 and decides the hydraulic pressure command value for the right steering clutch 38 in accordance with the correction right operation amount. At this time, the correction right operation amount is used in place of the abovementioned right operation amount. The controller 50 outputs a command signal in accordance with the decided hydraulic pressure command value to the right clutch control valve 46. As a result, the right steering clutch 38 is controlled in accordance with the correction right operation amount and the work vehicle 1 turns toward the right.

In step S206, the operation of the left operating lever is deactivated. Therefore, the left steering clutch 36 is in the engaged state and the left brake device 37 is in the non-braking state.

As described above, during the combined operation, the controller 50 determines that the operation having the largest operation amount is valid between the left operating lever and the right operating lever. The controller 50 then controls the lever corresponding to the valid operation lever between the left steering clutch 36 and the right steering clutch 38 in accordance with the difference between the left operation amount and the right operation amount. Consequently, the work vehicle 1 turns toward the left or toward the right.

FIG. 8 is a flow chart illustrating processing for controlling the left brake device 37 and the right brake device 39 during a combined operation. As illustrated in FIG. 8, in step S301, the controller 50 determines whether the left operation amount is equal to or greater than the threshold da and whether the right operation amount is equal to or greater than the threshold da. When the left operation amount is equal to or greater than the threshold da and the right operation amount is not equal to or greater than the threshold da, the processing advances to step S302. That is, when at least one of the left operation amount and the right operation amount is less than the threshold da, the processing advances to step S302.

The processing from step S302 onward in FIG. 8 is processing for controlling the left brake device 37 and the right brake device 39 during the turning control. In step S302, the controller 50 determines whether the left operation amount is greater than the right operation amount. When the left operation amount is greater than the right operation amount, the processing advances to step S303.

In step S303, the controller 50 calculates the correction left operation amount. The controller 50 derives a value obtained by subtracting the right operation amount from the left operation amount as the correction left operation amount.

In step S304, the controller 50 then refers to the first brake command data and controls the left brake device 37 in accordance with the correction left operation amount. The controller 50 refers to the first brake command data depicted in FIG. 6 and decides the hydraulic pressure command value for the left brake device 37 in accordance with the correction left operation amount. At this time, the correction left operation amount is used in place of the abovementioned left operation amount. The controller 50 outputs a command signal in accordance with the decided hydraulic pressure command value to the left brake control valve 45. As a result, the left brake device 37 is controlled in accordance with the correction left operation amount and the work vehicle 1 turns toward the left.

In step S304, the operation of the right operating lever is deactivated. Therefore, the right steering clutch 38 is in the engaged state and the right brake device 39 is in the non-braking state.

In step S302, when the left operation amount is not greater than the right operation amount, the processing advances to step S305. In step S305, the controller 50 determines whether the right operation amount is greater than the left operation amount. When the right operation amount is greater than the left operation amount, the processing advances to step S306.

In step S306, the controller 50 calculates the correction right operation amount. The controller 50 derives a value obtained by subtracting the left operation amount from the right operation amount as the correction right operation amount.

In step S307, the controller 50 then refers to the first brake command data and controls the right brake device 39 in accordance with the correction right operation amount. The controller 50 refers to the first brake command data depicted in FIG. 6 and decides the hydraulic pressure command value for the right brake device 39 in accordance with the correction right operation amount. At this time, the correction right operation amount is used in place of the abovementioned right operation amount. The controller 50 outputs a command signal in accordance with the decided hydraulic pressure command value to the right brake control valve 47. As a result, the right brake device 39 is controlled in accordance with the correction right operation amount and the work vehicle 1 turns toward the right.

In step S307, the operation of the left operating lever is deactivated. Therefore, the left steering clutch 36 is in the engaged state and the left brake device 37 is in the non-braking state.

As described above, during the combined operation, the controller 50 determines that the operation having the largest operation amount is valid between the left operating lever and the right operating lever when at least one of the left operation amount and the right operation amount is less than the threshold da. The controller 50 then controls the lever corresponding to the valid operation lever between the left brake device 37 and the right brake device 39 in accordance with the difference between the left operation amount and the right operation amount. Consequently, the work vehicle 1 turns toward the left or toward the right.

When both the left operation amount and the right operation amount are equal to or greater than the threshold da in step S301, the processing illustrated in FIG. 9 is executed. FIG. 9 is a flow chart which illustrates processing of deceleration control of the work vehicle 1 during the combined operation.

As illustrated in FIG. 9, in step S401, the controller 50 reduces the rotation speed of the engine 14. The controller 50 refers to engine command data for the deceleration control and decides a target rotation speed for the engine 14 from the left operation amount and the right operation amount. The engine command data for the deceleration control is stored in the storage device of the controller 50 in a table format and the like. However, the format of the engine command data is not limited to a table and may be in another format such as an equation or the like.

Figure 10:
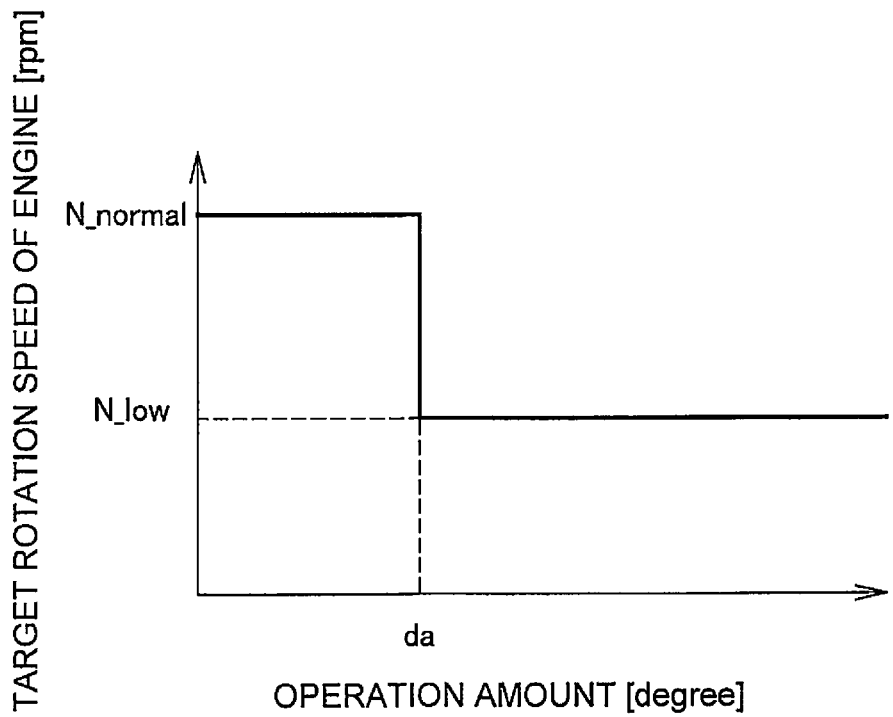
FIG. 10 illustrates an example of engine command data during the deceleration control.

Specifically, when both the left operation amount and the right operation amount are equal to or greater than the threshold da, the controller 50 reduces the target rotation speed of the engine 14 to a predetermined value "N_low" as illustrated in FIG. 10. The target rotation speed "N_normal" in FIG. 10 is the target rotation speed of the engine 14 when at least one of the left operation amount and the right operation amount is less than the threshold da. The target rotation speed "N_normal" is, for example, the target rotation speed set with the operating device 54 for the engine rotation speed. In this case, when both the left operation amount and the right operation amount are equal to or greater than the threshold da, the controller 50 reduces the target rotation speed of the engine 14 from "N_normal" to "N_low." Preferably, N_low is a value in the vicinity of a low idling speed.

The threshold da and the target rotation speed "N_low" are stored in the storage device of the controller 50 as the engine command data for the deceleration control. However, the engine command data for the deceleration control is not limited to the target rotation speed "N_low" and may be represented by other data for reducing the target rotation speed such as a reduction amount from "N_normal." For example, the controller 50 may decide a value obtained by subtracting a predetermined reduction amount from the current target rotation speed, as the target rotation speed for the deceleration control.

Figure 11:
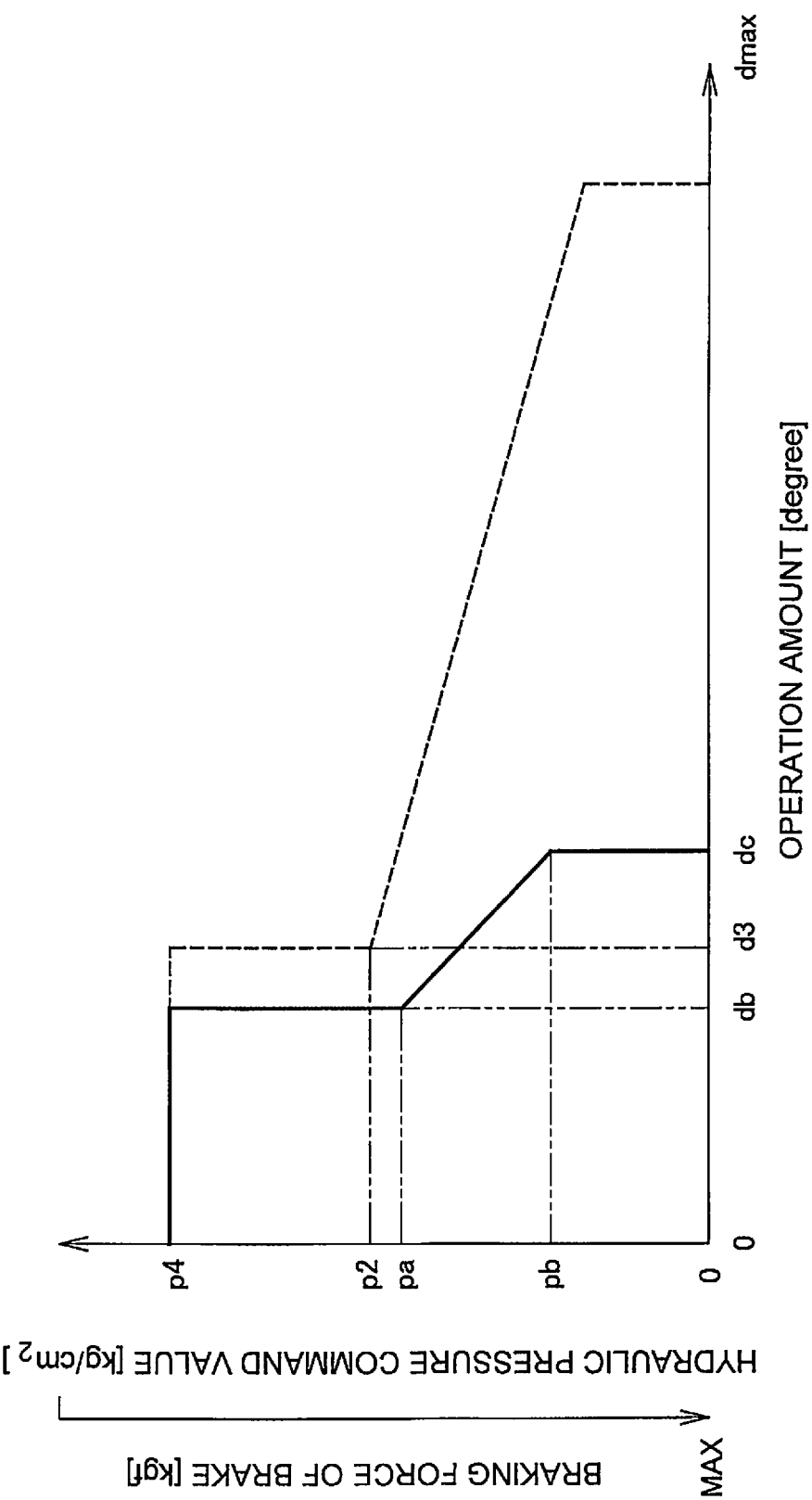
FIG. 11 illustrates an example of second brake command data.

In step S402, the controller 50 refers to second brake command data and controls the left brake device 37 and the right brake device 39 in accordance with a reference operation amount. FIG. 11 illustrates second brake command data. The abovementioned first brake command data is brake command data for the turning control, and the second brake command data is brake command data for the deceleration control. In FIG. 11, the second brake command data is indicated by a solid line and the first brake command data is indicated by a dashed line.

The reference operation amount is the smaller of the left operation amount and the right operation amount. The second brake command data defines the relationship between the reference operation amount and the hydraulic pressure command values for the left brake device 37 and the right brake device 39. That is, the controller 50 refers to the second brake command data and decides the hydraulic pressure command value in accordance with the reference operation amount as the hydraulic pressure command value for the left brake device 37. The controller 50 refers to the second brake command data and decides the hydraulic pressure command value in accordance with the reference operation amount as the hydraulic pressure command value for the right brake device 39.

The controller 50 outputs a command signal in accordance with the decided hydraulic pressure command value to the left brake control valve 45. The controller 50 outputs a command signal in accordance with the decided hydraulic pressure command value to the right brake control valve 47. Consequently, the left brake device 37 and the right brake device 39 are controlled in accordance with the reference operation amount. As a result, the work vehicle 1 is braked and the speed is reduced.

When the left operation amount and the right operation amount are both equal to or greater than the threshold da, the hydraulic pressure command value for the left brake device 37 and the hydraulic pressure command value for the right brake device 39 are the same. Therefore, when the left operation amount and the right operation amount are both equal to or greater than the threshold da, the braking forces of the left brake device 37 and the right brake device 39 are the same.

As illustrated in FIG. 11, the controller 50 reduces the hydraulic pressure command value when the reference operation amount is equal to or greater than the threshold db rather than when the reference operation amount is less than the threshold db. Therefore, the controller 50 increases the braking force of the left brake device 37 and the right brake device 39 when the reference operation amount is equal to or greater than the threshold db rather than when the reference operation amount is less than the threshold db. The threshold db may be greater than the threshold da. Alternatively, the threshold db may be the same as the threshold da.

The controller 50 reduces the hydraulic pressure command value from "pa" to "pb" in accordance with the increase in the reference operation amount when the reference operation amount is equal to or greater than the threshold db and less than the threshold dc. Therefore, the controller 50 increases the braking force of the left brake device 37 and the right brake device 39 in accordance with the increase in the reference operation amount when the reference operation amount is equal to or greater than the threshold db and less than the threshold dc. The threshold dc is greater than the threshold db.

The controller 50 reduces the hydraulic pressure command value more when the reference value is equal to or greater than the threshold dc than when the reference value is less than the threshold dc. Therefore, the controller 50 increases the braking force of the left brake device 37 and the right brake device 39 more when the reference operation amount is equal to or greater than the threshold dc than when the reference operation amount is less than the threshold dc.

Specifically, the controller 50 sets the hydraulic pressure command value to "0" when the reference operation amount is equal to or greater than the threshold dc. Therefore, the controller 50 maximizes the braking force of the left brake device 37 and the right brake device 39 when the reference operation amount is equal to or greater than the threshold dc. However, the braking forces of the left brake device 37 and the right brake device 39 may be values smaller than the maximum values when the reference operation amount is equal to or greater than the threshold dc.

In the work vehicle 1 according to the embodiment discussed above, the operator is able to cause the vehicle to turn toward the left by operating the left steering lever 55. The operator is able to cause the vehicle to turn toward the right by operating the right steering lever 56.

In addition, when the operator operates both the left steering lever 55 and the right steering lever 56, the abovementioned turning control during the combined operation is executed. In the turning control during the combined operation, when the left operation amount is larger than the right operation amount, the left steering clutch 36 is controlled so as to cause the work vehicle 1 to turn toward the left in accordance with the correction left operation amount. When the right operation amount is larger than the operation amount of the left steering lever, the right steering clutch 38 is controlled so as to cause the work vehicle 1 to turn toward the right in accordance with the correction right operation amount.

As a result, even when the left steering lever 55 and the right steering lever 56 are operated at the same time, the operation having the larger operation amount is considered valid. Therefore, the state in which both the left steering clutch 36 and the right steering clutch 38 are completely released and both the left brake device 37 and the right brake device 39 are in a non-braking state can be prevented when the left steering lever 55 and the right steering lever 56 are operated at the same time. As a result, steering performance of the work vehicle during turning can be improved.

The operator is able to operate the left steering lever 55 and the right steering lever 56 with his/her fingers. Therefore, the operator is able to easily turn the work vehicle 1 to the left and right and with two fingers of one hand.

Although the embodiment of the present invention has been described so far, the present invention is not limited to the above embodiment and various modifications may be made within the scope of the invention.

The work vehicle 1 is not limited to a bulldozer, and may be another type of work vehicle such as a wheel loader or a motor grader, or the like. The travel device is not limited to a crawler belt type of device and may be tires or another type of device. The steering devices are not limited to clutch devices and brake devices and may be other types of devices such as a hydraulically operated steering motor or the like.

The work vehicle 1 may be a vehicle that can be remotely operated. The controller 50 may be disposed outside of the work vehicle 1. For example, the controller 50 may be disposed inside a control center separated from the work site. The operating devices 51 to 56 may also be disposed outside of the work vehicle 1. In this case, the operating cabin 4 may be omitted from the work vehicle 1. Alternatively, the operating devices 51 to 56 may be omitted from the work vehicle 1.

Figure 12:
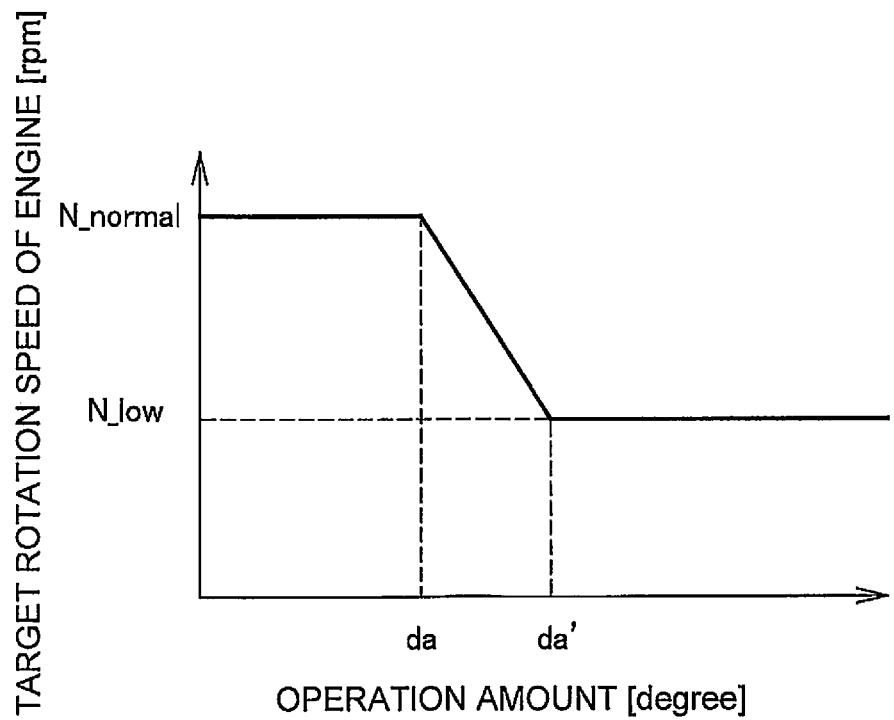
FIG. 12 illustrates engine command data according to a modified example.

The engine command data, the clutch command data, the first brake command data, or the second brake command data may be changed. For example, FIG. 12 illustrates engine command data according to a modified example. In the engine command data according to the modified example, the reference operation amount is gradually reduced in accordance with an increase in the reference operation amount between "da" and "da'." As a result, the rotation speed of the engine 14 can be gradually reduced in accordance with the operation of the left steering lever 55 and the right steering lever 56.

Figure 13:
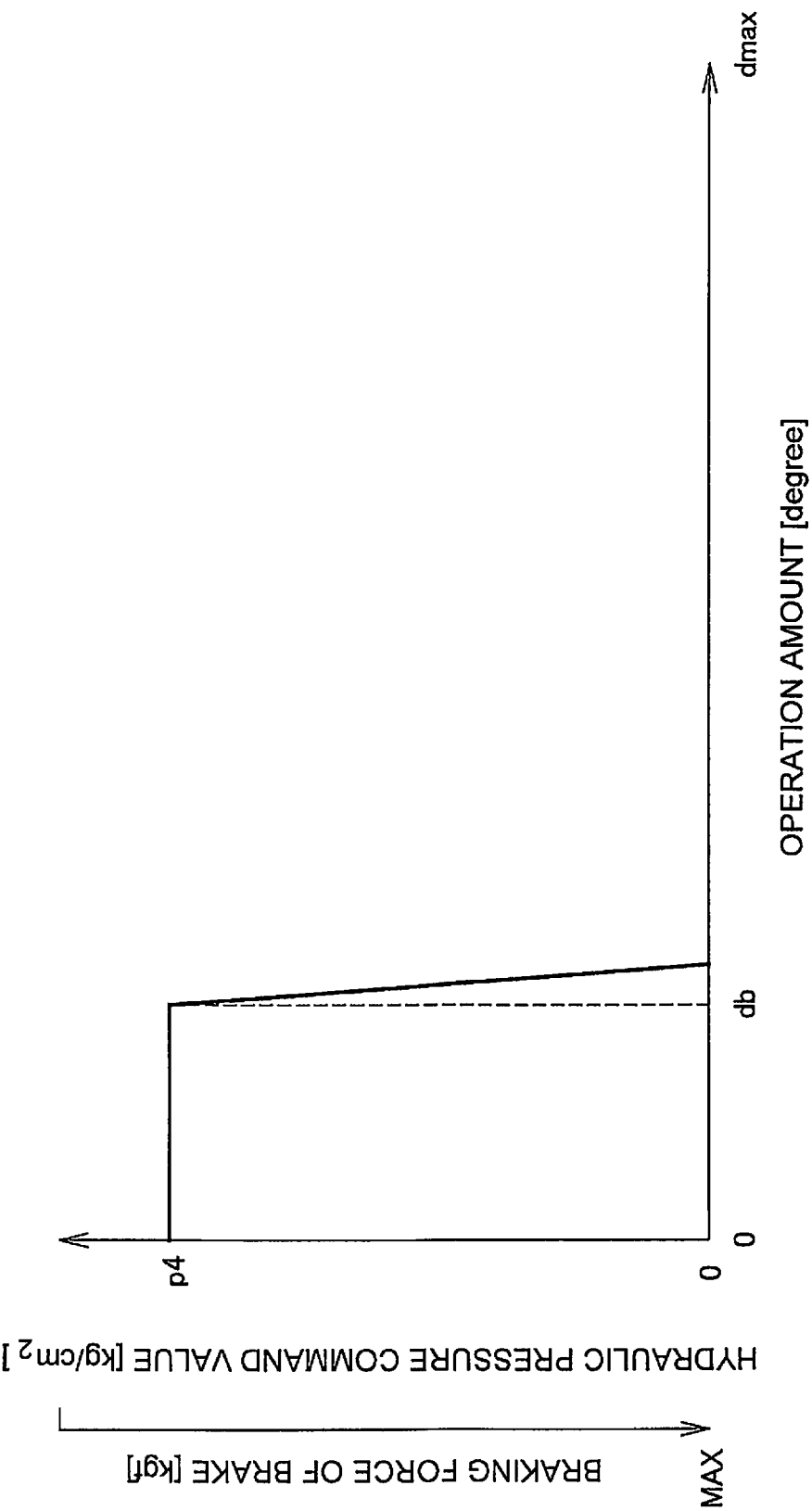
FIG. 13 illustrates second brake command data according to a modified example.

FIG. 13 illustrates second brake command data according to a modified example. In the second brake command data according to the modified example, the hydraulic pressure command value is rapidly reduced while the reference operation amount is in the vicinity of "db." As a result, the work vehicle 1 can be decelerated rapidly in accordance with the operation of the left steering lever 55 and the right steering lever 56.

The deceleration control is executed in the above embodiment when both the left operation amount and the right operation amount are equal to or greater than the threshold da at the time of the combined operation. However, the deceleration control may be omitted and only the turning control may be executed at the time of the combined operation.

The calculation of the correction left operation amount or the correction right operation amount is not limited to the abovementioned method and may be calculated using another method. For example, the correction left operation amount or the correction right operation amount may be calculated by multiplying the left operation amount or the right operation amount by a predetermined coefficient.

The shape or the disposition of the operating devices 51 to 56 may be changed. The shape or the disposition of the left steering lever 55 and the right steering lever may be changed. For example, the left steering lever 55 and the right steering lever 56 may be disposed so as to be spaced away to the right and left of the operator's seat 61. The left steering lever 55 and the right steering lever 56 may be operated by the operator with his/her left and right arms.

Figure 14:
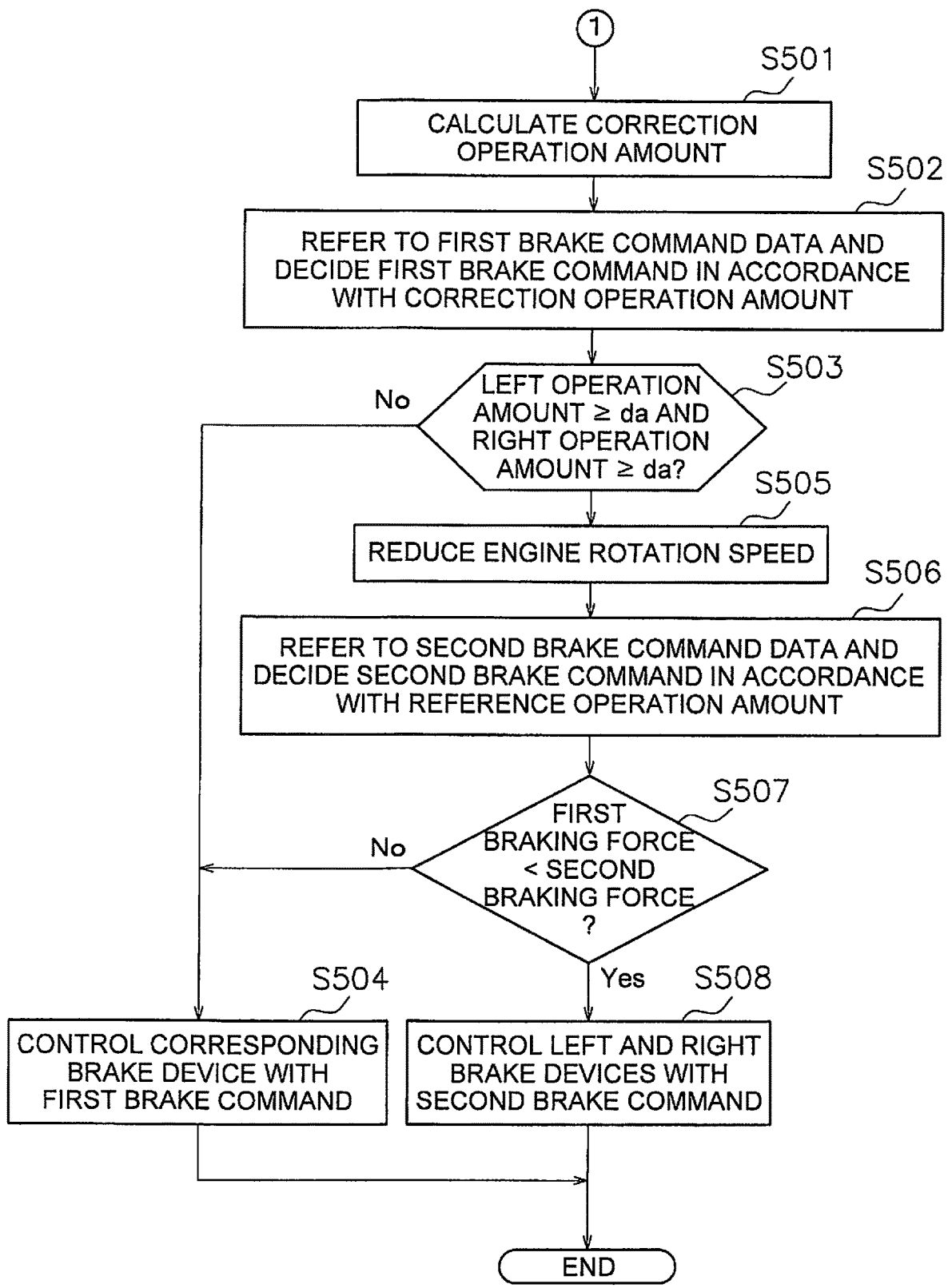
FIG. 14 is a flow chart which illustrates processing of a control during a combined operation according to another embodiment.

The turning control is not executed and the deceleration control is executed in the above embodiment when both the left operation amount and the right operation amount are equal to or greater than the threshold da at the time of the combined operation. However, the turning control and the deceleration control may be selectively executed when both the left operation amount and the right operation amount are equal to or greater than the threshold da at the time of the combined operation. FIG. 14 is a flow chart which indicates processing of a control during a combined operation according to another embodiment.

As illustrated in FIG. 14, in step S501, the controller 50 calculates a correction operation amount. The processing here is the same as the processing in steps S302, S303, S305, and S306 in FIG. 8. That is, the controller 50 decides the abovementioned correction left operation amount as the correction operation amount in step S501 when the left operation amount is greater than the right operation amount. The controller 50 decides the abovementioned correction right operation amount as the correction operation amount in step S501 when the right operation amount is greater than the left operation amount.

In step S502, the controller 50 refers to the first brake command data and decides a first brake command in accordance with the correction operation amount. The first brake command is the hydraulic pressure command value for the left brake device 37 or the right brake device 39 in accordance with the correction operation amount.

In step S503, the controller 50 determines whether the left operation amount is equal to or greater than the threshold da and whether the right operation amount is equal to or greater than the threshold da. When the left operation amount is equal to or greater than the threshold da and the right operation amount is not equal to or greater than the threshold da, the processing advances to step S504. That is, when at least one of the left operation amount and the right operation amount is less than the threshold da, the processing advances to step S504.

In step S504, the controller 50 controls the corresponding brake device with the first brake command. That is, when the left operation amount is greater than the right operation amount, the controller 50 controls the left brake device 37 with the first brake command that corresponds to the correction left operation amount in the same way as in step S304. When the right operation amount is greater than the left operation amount, the controller 50 controls the right brake device 39 with the first brake command that corresponds to the correction right operation amount in the same way as in step S307.

When both the left operation amount and the right operation amount are equal to or greater than the threshold da in step S503, the processing advances to step S505. In step S505, the controller 50 reduces the engine rotation speed in the same way as in step S401.

In step S506, the controller 50 refers to the second brake command data and decides a second brake command in accordance with the reference operation amount. The second brake command is the hydraulic pressure command value for the left brake device 37 and the right brake device 39 in accordance with the reference operation amount.

In step S507, the controller 50 determines whether a first braking force is less than a second braking force. The first braking force is the braking force produced by the first brake command decided in step S502. The second braking force is the braking force produced by the second brake command decided in step S506.

When the first braking force is less than the second braking force, the processing advances to step S508. In step S508, the controller 50 controls the left brake device 37 and the right brake device 39 with the second brake command. The controller 50 controls the left brake device 37 and the right brake device 39 with the second brake command that corresponds to the reference operation amount in the same way as in step S402.

In step S507, when the first braking force is not less than the second braking force, the processing advances to step S504. That is, when the first braking force is equal to or greater than the second braking force, the processing advances to step S504. In step S504, the controller 50 controls the corresponding brake device with first brake command as indicated above.

As described above, the turning control and the deceleration control may be selectively executed when both the left operation amount and the right operation amount are equal to or greater than the threshold da at the time of the combined operation in the control for the combined operation according to the other embodiment. Specifically, the turning control is executed when the first braking force is equal to or greater than the second braking force even if both the left operation amount and the right operation amount are equal to or greater than the threshold da at the time of the combined control. In addition, the deceleration control is executed when both the left operation amount and the right operation amount are equal to or greater than the threshold da at the time of the combined control and the first braking force is less than the second braking force.

According to the present invention, steering performance of the work vehicle during turning can be improved.

What is claimed is:
1. A work vehicle comprising:
a vehicle body;
an engine disposed in the vehicle body;
a left travel device attached to the vehicle body, and the left travel device being driven with driving power from the engine;
a right travel device attached to the vehicle body, and the right travel device being driven with driving power from the engine;
a steering device causing the vehicle body to turn, the steering device including
a left steering clutch connected to the left travel device, and
a right steering clutch connected to the right travel device;
a left steering lever disposed so as to be operable by an operator;
a right steering lever disposed so as to be operable by the operator; and
a controller configured to receive
a signal indicating an operation amount of the left steering lever and
a signal indicating an operation amount of the right steering lever,
the controller being further configured to
control the left steering clutch so as to cause the vehicle body to turn leftward in accordance with the operation amount of the left steering lever when the left steering lever is operated without the right steering lever being operated, control the right steering clutch so as to cause the vehicle body to turn rightward in accordance with the operation amount of the right steering lever when the right steering lever is operated without the left steering lever being operated, when the left steering lever and the right steering lever are both operated and the operation amount of the left steering lever is larger than the operation amount of the right steering lever, calculate a correction left operation amount in which the operation amount of the left steering lever is corrected according to the operation amount of the right steering lever, and control the left steering clutch so as to cause the vehicle body to turn leftward in accordance with the correction left operation amount, and when the left steering lever and the right steering lever are both operated and the operation amount of the right steering lever is larger than the operation amount of the left steering lever, calculate a correction right operation amount in which the operation amount of the right steering lever is corrected according to the operation amount of the left steering lever, and control the right steering clutch so as to cause the vehicle body to turn rightward in accordance with the correction right operation amount.

2. The work vehicle according to claim 1, wherein the controller is further configured to when the left steering lever and the right steering lever are both operated and the operation amount of the left steering lever is larger than the operation amount of the right steering lever, calculate the correction left operation amount from a value obtained by subtracting the operation amount of the right steering lever from the operation amount of the left steering lever, and when the left steering lever and the right steering lever are both operated and the operation amount of the right steering lever is larger than the operation amount of the left steering lever, calculate the correction right operation amount from a value obtained by subtracting the operation amount of the left steering lever from the operation amount of the right steering lever.

3. The work vehicle according to claim 1, wherein the controller is further configured to when the left steering lever and the right steering lever are both operated and the operation amount of the left steering lever is larger than the operation amount of the right steering lever, maintain an engaged state of the right steering clutch, and when the left steering lever and the right steering lever are both operated and the operation amount of the right steering lever is larger than the operation amount of the left steering lever, maintain an engaged state of the left steering clutch.

4. The work vehicle according to claim 1, wherein the steering device further includes a left brake device connected to the left travel device, and a right brake device connected to the right travel device, and the controller is further configured to control the left brake device and the left steering clutch so as to cause the vehicle body to turn leftward in accordance with the operation amount of the left steering lever when the left steering lever is operated without the right steering lever being operated, control the right brake device and the right steering clutch so as to cause the vehicle body to turn rightward in accordance with the operation amount of the right steering lever when the right steering lever is operated without the left steering lever being operated, control the left brake device and the left steering clutch so as to cause the vehicle body to turn leftward in accordance with the correction left operation amount when both the left steering lever and the right steering lever are operated and the operation amount of the left steering lever is larger than the operation amount of the right steering lever, and control the right brake device and the right steering clutch so as to cause the vehicle body to turn rightward in accordance with the correction right operation amount when both the left steering lever and the right steering lever are operated and the operation amount of the right steering lever is larger than the operation amount of the left steering lever.

5. The work vehicle according to claim 1, further comprising:

an operator's seat disposed on the vehicle body; and a console disposed beside the operator's seat, the left steering lever being attached to the console, and the right steering lever being attached to the console.

6. The work vehicle according to claim 5, wherein the left steering lever is operable with the fingers of the operator, and the right steering lever is operable with the fingers of the operator.

7. A method performed with a controller in order to control a work vehicle, the work vehicle including a left steering clutch and a right steering clutch, the method comprising:

receiving a signal indicating an operation amount of a left steering lever;

receiving a signal indicating an operation amount of a right steering lever;

controlling the left steering clutch so as to cause the work vehicle to turn leftward in accordance with the operation amount of the left steering lever when the left steering lever is operated without the right steering lever being operated;

controlling the right steering clutch so as to cause the work vehicle to turn rightward in accordance with the operation amount of the right steering lever when the right steering lever is operated without the left steering lever being operated;

when the left steering lever and the right steering lever are both operated and the operation amount of the left steering lever is larger than the operation amount of the right steering lever, calculating a correction left operation amount in which the operation amount of the left steering lever is corrected according to the operation amount of the right steering lever, and controlling the left steering clutch so as to cause the vehicle body to turn leftward in accordance with the correction left operation amount; and when the left steering lever and the right steering lever are both operated and the operation amount of the right steering lever is larger than the operation amount of the left steering lever,
- calculating a correction right operation amount in which the operation amount of the right steering lever is corrected according to the operation amount of the left steering lever, and
- controlling the right steering clutch so as to cause the vehicle body to turn rightward in accordance with the correction right operation amount.

8. The method according to claim 7, wherein
the correction left operation amount is calculated from a value obtained by subtracting the operation amount of the right steering lever from the operation amount of the left steering lever when
- the left steering lever and the right steering lever are both operated and
- the operation amount of the left steering lever is larger than the operation amount of the right steering lever, and the correction right operation amount is calculated from a value obtained by subtracting the operation amount of the left steering lever from the operation amount of the right steering lever when
- the left steering lever and the right steering lever are both operated and
- the operation amount of the right steering lever is larger than the operation amount of the left steering lever.

9. The method according to claim 7, further comprising:
maintaining an engaged state of the right steering clutch when the left steering lever and the right steering lever are both operated and the operation amount of the left steering lever is larger than the operation amount of the right steering lever, and maintaining an engaged state of the left steering clutch when the left steering lever and the right steering lever are both operated and the operation amount of the right steering lever is larger than the operation amount of the left steering lever.

10. The method according to claim 7, wherein the work vehicle further includes a left brake device and a right brake device, the method further comprising:
controlling the left brake device so as to cause the work vehicle to turn leftward in accordance with the operation amount of the left steering lever when the left steering lever is operated without the right steering lever being operated;

controlling the right brake device so as to cause the work vehicle to turn rightward in accordance with the operation amount of the right steering lever when the right steering lever is operated without the left steering lever being operated;

controlling the left brake device so as to cause the vehicle body to turn leftward in accordance with the correction left operation amount when
- both the left steering lever and the right steering lever are operated and
- the operation amount of the left steering lever is larger than the operation amount of the right steering lever; and controlling the right brake device so as to cause the vehicle body to turn rightward in accordance with the correction right operation amount when
- both the left steering lever and the right steering lever are operated and
- the operation amount of the right steering lever is larger than the operation amount of the left steering lever.

* * * * *